United States Patent
Needleman

[11] 3,796,532
[45] Mar. 12, 1974

[54] APPARATUS FOR CONTOUR MOLDING OF EXTRUDED MATERIAL

[76] Inventor: Mark Needleman, 3666 Salina Rd., Philadelphia, Pa. 19154

[22] Filed: July 26, 1972

[21] Appl. No.: 275,214

[52] U.S. Cl............................. 425/325, 264/210 R
[51] Int. Cl............................................ B29c 24/00
[58] Field of Search..... 425/325; 264/176 R, 177 R, 264/210 R, 108

[56] References Cited
UNITED STATES PATENTS

| | | | |
|---|---|---|---|
| 1,340,969 | 5/1920 | Minter | 425/325 X |
| 1,678,390 | 7/1928 | Fuller | 264/177 R X |
| 1,932,821 | 10/1933 | Henkel | 425/325 X |
| 3,329,998 | 7/1967 | Stohr | 425/435 X |
| 3,430,290 | 3/1969 | Kinslow, Jr. | 425/325 X |

*Primary Examiner*—R. Spencer Annear

[57] ABSTRACT

An extruding head for progressively contouring to shape the external surface of a continuously moving column of extruded plasticized material within the limit of its initial diameter. To this end the head includes one or more rapidly rotating shaping elements which fly about and engage the extrusion as it exits from an extrusion chamber and operate to smoothly shape the extrusion to its desired contour. Means are provided to variably adjust the spacing between the extrusion-engaging tip of each shaping element and its axis of rotation so that as the extrusion progresses past said element the diameter of the extrusion may be progressively reduced, increased or held to any diameter determined by said spacing. The extrusion head also provides for the use of a single extrusion-engaging element which spins about the continuously discharging extrusion to helically thread or groove its surface. Also provided are means for heating or cooling the extrusion as it moves through the extrusion chamber and for applying a coloring medium to the extrusion to be worked into and about the surface thereof by the aforesaid shaping element.

12 Claims, 6 Drawing Figures

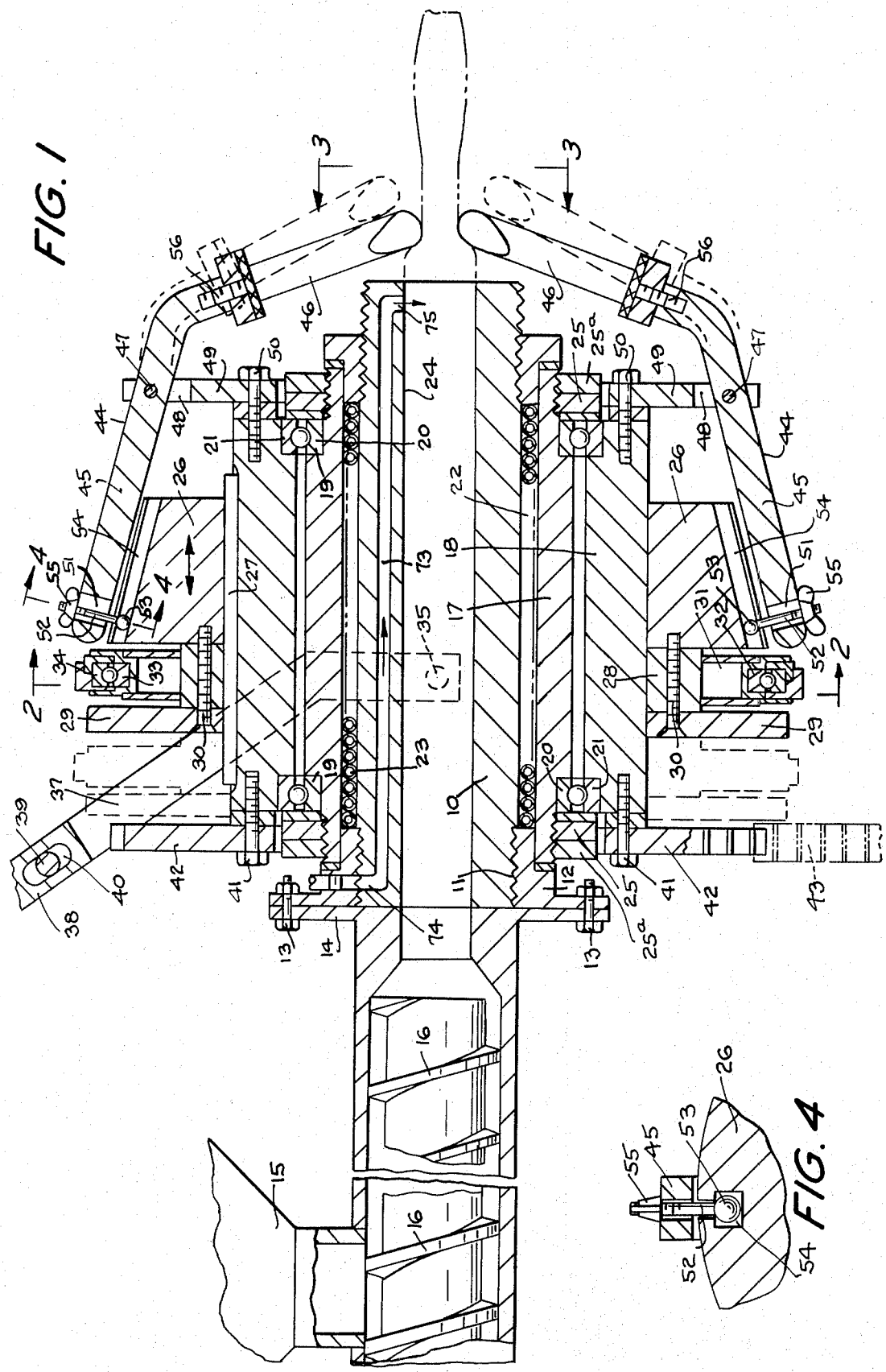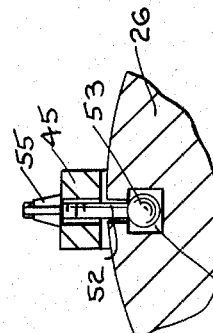

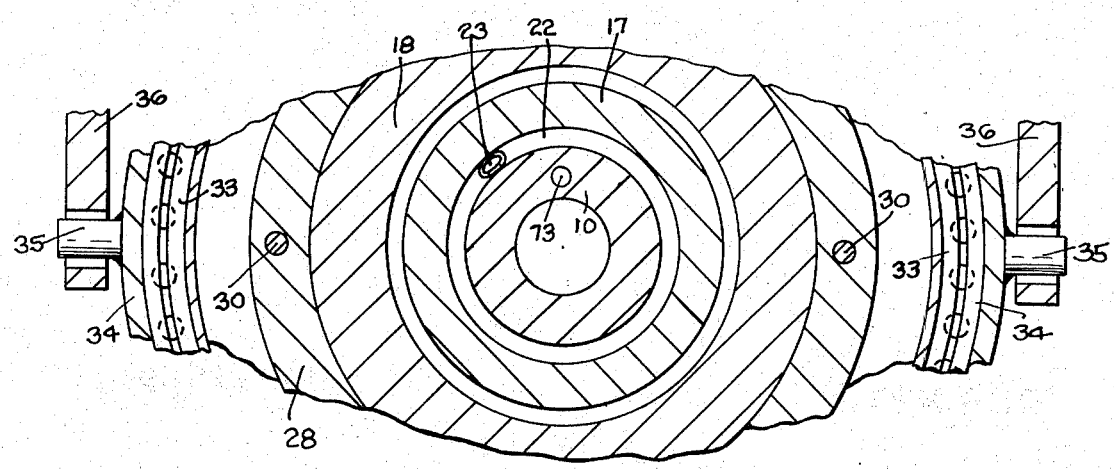
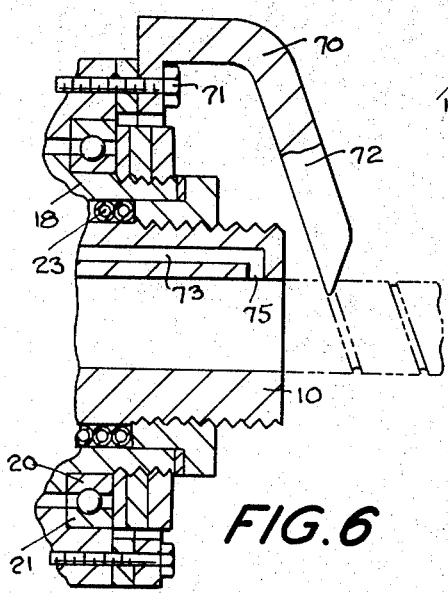
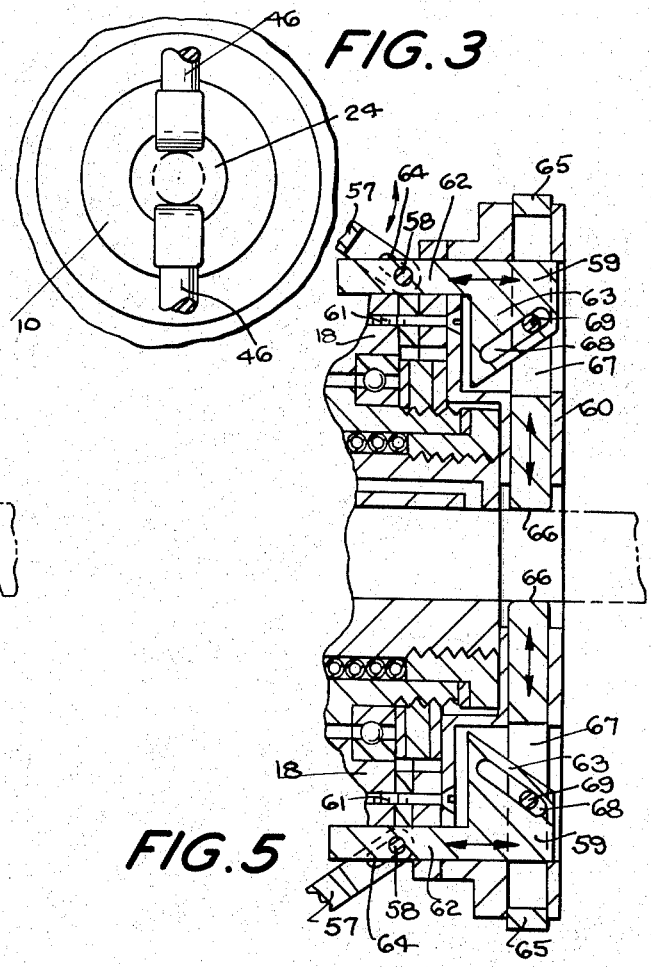

APPARATUS FOR CONTOUR MOLDING OF EXTRUDED MATERIAL

This invention relates generally to extrusion apparatus and more particularly to an apparatus for and method of shaping to any desired external contour compositions such as plastic foams, thermo-plastics and like deformable materials as the same issue continuously from an extrusion chamber in the form of a column of uniform diameter.

More particularly, it is an important object of the present invention to produce extrusions of plasticized material which are shaped by a system of shaping members which revolve rapidly about and engage the external surface of the extrusion as it exists from its extruding chamber to thereby smoothly and progressively shape it to any desired reduced diameter along the length of the shaped extrusion, whereby the same may be tapered or alternately increased and decreased in diameter into the form of a solid cylindrical extrusion of any desired longitudinally extending external contour.

The foregoing and other objects of the present invention will appear more fully from the following specification, it being understood that the invention consists in the combination, construction, location and relative arrangement of parts as described in the specification, as shown in the accompanying drawings and as finally pointed out in the appended claims.

In the accompanying drawings:

FIG. 1 is a longitudinal sectional view of the extruder constructed in accordance with and embodying the principles of the present invention;

FIG. 2 is a transverse sectional view of the extruder as taken along the line 2—2 of FIG. 1;

FIG. 3 is a partial end elevational view of the extruder as viewed from the line 3—3 of FIG. 1;

FIG. 4 is a detail sectional view as taken along the line 4—4 of FIG. 1;

FIG. 5 is a longitudinal sectional view of the extruding end of the extruder as modified for threading or otherwise scoring the extrusion as it exits from the extruder; and FIG. 6 is a partial longitudinal sectional view of the discharge end of the extruder showing a modified construction thereof.

Referring now to the drawings and more particularly to FIGS. 1 to 4 thereof, it will be observed that the extrusion molding head of the present invention essentially includes a central longitudinally extending hollow cylinder 10 which serves as the chamber through which is expressed under suitable pressure the plasticized material to be extruded. The rear end of this cylinder 10 is provided with any suitable means for attachment thereof to any conventional apparatus for continuously feeding the extrusion material such as plastic foams, thermo-plastics and the like, to and through the central bore of the cylinder. In the construction as shown, the rear end of the cylinder 10 is threaded, as at 11, to threadedly receive thereon a flanged fitting 12 which is adapted to be bolted as by the bolts 13, to the flange 14 of a material feeding apparatus having a hopper 15 from which the material to be extruded is fed to a feed screw 16 for forcing the material to and through the cylinder 10.

This cylinder 10, which is stationary, serves as the central support for a revolving system of radially shiftable shaping elements which are operative upon the extruded material as it exits from the discharge end of the cylinder to either uniformly reduce the diameter of the extrusion or vary as desired the diameter of the extrusion along the length thereof so as to provide it with sequential areas of circular cross section having progressively increasing and decreasing diameters.

Thus, as best appears in FIG. 1, the central stationary cylinder 10 has fixedly secured thereto a concentric cylindrical member 17 which in turn is embraced by a revoluble cylindrical member 18 suitably supported for rotation relatively to the member 17 by axially spaced anti-friction bearing assemblies 19—19 each having race-ways 20 and 21 respectively secured to the members 17 and 18.

While in certain constructions the member 17 which is suitably keyed or otherwise fixed to the hollow central cylinder 10 may be formed as an integral part of the latter, in the construction as shown the separate member 17 is employed to more conveniently provide an annular space 22 between the two members 10 and 17 for accommodating therein a coil 23 which may serve to circulate either a coolant fluid or a heating fluid about the cylinder 10 to cool or heat, as may be desired, the extrusion material flowing through the bore 24 of the cylinder 10. Also, if desired, the annular space 23 may be utilized to accommodate therein a suitable electrically controlled heat resistance wire in lieu of the fluid heating coil. In either case, the bearing assemblies 19—19 are held fixed in position by end washers 25 locked in place by nuts 25a threaded upon the opposite ends of the stationary support for the bearing assemblies.

The revoluble cylinder 18, which is held by the bearing assemblies in axially fixed relation to its stationary cylindrical support, is externally fitted with an encircling axially shiftable camming member 26 of generally frusto-conical shape. This camming member 26 (as see FIG. 1) is splined, as by the spline 27, to the revoluble member 18 so as to effect rotation of the camming member commonly with its supporting member 18 and yet permit axial shifting of the camming member relatively to its support in either of the two opposite directions indicated by the double pointed arrow in FIG. 1.

Secured to and movable with the camming member 26 as a fixed part thereof splined to the revoluble cylinder 18 is a collar 28 and an end plate 29 both commonly secured to the member 26 by circumferentially spaced screws 30. The collar 28 has fixed thereto a radially extending support assembly 31 for an anti-friction bearing 32 the inner raceway 33 of which is secured to said support assembly for rotation commonly with camming member 26. The relatively rotatable outer raceway 34 of the antifriction bearing 32, which may be held against rotation with the camming member, is nevertheless free to shift axially with the camming member and thereby shift the latter axially in either direction within the limits permitted by the spline 27.

In order to effect this axial shifting of the camming member 26, the relatively non-rotating outer raceway 34 of the anti-friction bearing assembly 32 is externally provided with a pair of diametrically alined outwardly projecting studs 35—35 (as see Fig. 2) which respectively project through the opposite arms 36—36 of a yoke piece 37 disposed in straddling relation to the anti-friction bearing assembly 32. The freely extending operating arm 38 of the yoke is in turn pivotally secured to any suitable fixed support by a pivot pine 39 projecting through a slot 40 in said operating arm, which slot is sufficiently elongated to provide sufficient play of the latter about its pivot for rectilinear shifting of the camming member 26 by the yoke piece 37 as it is rocked in one direction or the other about is pivot pin 39.

Any suitable means may be provided for effecting manual or mechanical operation of the yoke piece 37 and also any suitable means may be employed to effect rotation of the cam-supporting revoluble cylinder 18. To this latter end, as shown in FIG. 1, the rear end of the cylinder 18 may have secured thereto, as by the bolts 41, a gear wheel 42 adopted to be driven by a motor-driven gear entrained therewith, which latter gear is shown in phantom and designated by the reference numeral 43 in FIG. 1.

Operatively associated with the camming member 26 are a pair of diametrically opposed extrusion shaping elements 44—44 each of which is bent as shown to provide a rearwardly extending part 45 which overlies the camming member and a forewardly extending part 46 terminating at a point which enables its extremity to engage the extrusion material exiting from the extrusion chamber, i.e., the bore of the hollow central cylinder 10. The material-engaging extremities of the shaping elements 44—44 are so contoured that as they engage diametrically opposite sides of the column of material extruded from the cylinder 10 at relatively high rotative speeds, they conjointly smooth and work the surface of the material into a solid cylindrical cross-section shape having a diameter equal to the spacing between the extremities of the shaping elements.

These shaping elements 44—44 are respectively pivoted, as at 47—47, within outwardly presenting diametrically opposed radial slots 48—48 provided in a common pivot plate 49 secured, as by the screws 50, to the front end of the revoluble cylinder 18. The rear end portions of these shaping elements are each slotted, as at 51 to receive a securing bolt 52 having a headed inner end 53 seated in a guide slot or way 54 milled in the outer tapered surface of the camming member. These guide slots or ways 54, which extend from end to end of the camming member in respective radially spaced alinement with the rear end parts 45 of the shaping elements, hold the headed ends of the bolts 52 captive therein and by tightening the winged nuts 55 on these bolts, the shaping elements 44—44 are rigidly locked to the camming member 26 for rotation therewith.

It will be apparent that when the bolts 52 are loosened, the camming member is rendered free to axially move relatively to the shaping elements and thereby vary as desired the tilt of the shaping elements about their pivots 47—47 and accordingly the spacing between the extrusion engaging tips of the shaping elements.

Thus, when the camming member 26 is in its front-most position as shown in FIG. 1, the rear ends of the shaping elements are cammed thereby to their maximum permissible spread, in consequence of which the front extremities or tips of the shaping elements are correspondingly shifted inwardly toward each other for minimum spacing therebetween, thereby shaping the extruded material to a diameter which is less than that of its column as discharged from the extrusion chamber. However, when the camming member 26 is shifted into its rear-most position, as illustrated by the dotted lines representing the left hand portion of the camming assembly shown in FIG. 1, the rear ends of the shaping elements are cammed inwardly toward one another with the result that the front extremities or tips of the shaping elements are maximally spread apart as illustrated by their dashed line showing FIG. 1, in which latter condition of the shaping elements they do not effect any change in the diameter of the column of material extruded from the extrusion chamber.

By periodically shifting the camming member 36 back and forth during any given extrusion cycle of operation, the tip ends of the revolving shaping elements may be alternately spread further and closer apart and so held for any desired intervals of time to obtain any desired variation in the lengthwise external contour of the extrusion while maintaining the same uniformly circular in cross-section. FIG. 1 illustrates in phantom such an extrusion having successive cross-sectional areas of progressively increasing and decreasing diameters. Thus, any desired taper or other varying surface configuration may be imparted to the extrusion by change in the spacing of the tip ends of the shaping element relative to the central axis of the extrusion under control of the axially shiftable camming member 26. In any case where it is desired to produce an extrusion of a uniform diameter less than that of the column of material at its point of discharge from the extrusion chamber 10, it is only necessary to axially shift the camming member 26 relatively to the shaping fingers to a point which will present their tip ends in their spaced relation required for producing an extrusion having the desired reduced diameter, the camming member being then locked in its adjusted position to the shaping fingers by tightening the wing nuts 55 of the bolts 52.

If desired, the shaping elements 44—44 may have their frontal extremities sectionalized as shown in FIG. 1 with the sections jointed, as by the studs 56 carried by one section for threaded engagement with its adjoining section, thereby permitting quick replacement of the shaping tips as well as the substitution of tip sections of different lengths and end shapes.

FIG. 5 shows a modified construction of an extruding head operating in accordance with the principles of the present invention. In this modified construction the pivoted shaping elements are each respectively replaced by an actuating arm 57 the rear end of which (not shown) is secured to the camming member in the same manner and by means similar to that employed for connecting the rear ends of the previously described shaping elements 44—44 to the camming member. The fore ends of these arms 57—57 are respectively connected by transversely extending cam pins 58—58 to a pair of diametrically opposed, axially movable slide members 59—59 supported within a ring-shaped housing 60 secured to the front end of the revoluble cylinder 18, as by the circumferentially spaced screws 61, for rotation with said cylinder.

The slide members 59-59 are each generally L-shaped in form to provide the same with a rearwardly projecting extension 62 and a radially projecting inward extension 63. The fore ends of the arms 57—57 are each longitudinally notched to form a kerf within which is received the rearwardly projecting extension 62 of its associated slide member 59. The kerfed end of each arm 57 thus straddles the slide member extension 62 and is connected thereto by the cam pin 58 which projects transversely through the opposite side walls of the kerf as well as the guide extension 62 received therebetween. The opposite ends of the cam pin 58 ride in elongated cam slots 64 respectively formed in the opposite side walls of the kerf in consequence of which the raising and lowering of the arm 57 (under control of the camming member similar to that designated 26 in the previously described construction of FIG. 1) is translated into a fore and aft rectilinear motion of the slide member 59 along a line paralleling the axis of rotation of the revoluble cylinder 18.

The ring-shaped housing 60 which supports and guides the diametrically opposed slide members 59—59 also supports and guide a pair of extrusion shaping members 65—65 which are radially shiftable toward and away from one another to vary as desired the spacing between their inner extrusion engaging extremities 66—66. Each of these shaping members 65—65 is provided with an elongated slot 67 through which projects the radially projecting extension 63 of one slide member 59, which extension 63 is provided with an inclined cam slot 68 as shown. A cam pin 69 carried by the opposite walls of the slot 67 in the shaping member 65 projects through the inclined cam slot 68 of the guide extension slidable in the slotted shaping member so that any fore and aft rectilinear shifting of the slide members 59—59 as above mentioned is translated by the cam pins 69 riding in their cam slot 68 into radial shifting of the diametrically alined extrusion shaping members 65—65 to vary the spacing between their inner extremities.

It will be noted that the shaping members 65—65 are disposed for movement in a plane closely adjacent to the discharge end of the extrusion chamber so that they act on the column of the extrusion material practically at the instant that it exits from the bore of the central cylinder 10. Since the shaping members 65—65 revolve with the revoluble cylinder 18 and are radially shiftable to vary the gap between their inner extremities, it will be apparent that they operate to perform essentially the same function as that of the shaping elements 44—44 of the previously described construction shown in FIG. 1.

Although in the forms of the extruding head shown in FIGS. 1 and 6 each is provided with only a pair of diametrically opposed shaping elements for working the moving extrusion to shape, it will be apparent any convenient number of such elements may be circumferentially spaced about the axis of rotation of the revoluble cylinder 18 and the camming member 26 splined thereto, all of which are commonly acted upon by the camming member for rotation in unison about the extrusion being shaped. When two or more of such shaping elements are employed, it is only necessary to insure that their extrusion-engaging shaping tips are all similarly oriented relatively to their common axis of rotation, i.e., the axis of the extrusion and that such tips are all equally spaced radially from said axis. It is accordingly to be understood that the present invention is not limited to the presence in the head of any particular number of the flying shaping elements. In certain instances, where the extrusion is sufficiently rigid to be self-sustaining in position against the radial thrust of a shaping element, it is within the contemplation of this invention to employ but a single element having its extrusion-engaging extremity or tip formed to smoothly work the extrusion to the surface contour and cross-sectional size desired.

FIG. 6 shows such a single element construction wherein the revoluble cylinder 18, instead of carrying thereon one or more radially adjustable shaping elements operating under control of a revoluble camming member, is simply provided at its front end with a member 70, fixed to the cylinder 18 by a bolt 71. This member 70 is inwardly bent to provide a flying finger 72 having its free extremity shaped in this instance, to score the surface of the extrusion column as it emerges from the extrusion chamber. It will be apparent that upon rotation of this finger 72 while in scoring contact with the axially moving column of the extruded material, the outer surface is helically scored or threaded as illustrated in FIG. 6. If instead of scoring the extrusion, it was intended simply to smoothly shape the extrusion to its desired contour, it would be necessary only to employ a finger having a requisitely formed shaping tip.

The present invention also provides for introducing a fluent coloring medium into the surface of the extrusion, which medium is so worked into the body of the extrusion by the rotating shaping elements (44—44 of FIG. 1 and 65—65 of FIG. 5) as to effectively provide the extrusion with a permanently impregnated surface film or coating of any desired color. For this purpose, the central stationary cylinder 10 which constitutes the extrusion chamber has suitably formed in the wall thereof a longitudinally extending duct or flue 73 which terminates at its rear end in an outwardly presenting branch 74 adapted to be connected to any suitable supply (not shown) of the coloring fluid. The fluid is delivered by way of the flue 73 to a discharge port 75 located just within the extrusion discharging end of the extrusion chamber so that the coloring fluid is continuously carried by the extrusion to and between the extrusion shaping elements and is worked thereby into the surface of the extrusion to uniformly color the same.

It will be understood that the present invention is perceptible of various other changes and modifications which may be made from time to time without departing from the general principles or real spirit thereof, and it is accordingly intended to claim the same broadly, as well as specifically, as indicated by the appended claims.

What is claimed as new and useful is:

1. An extruding head for shaping the external contour of a continuously moving extrusion of plasticized material comprising, in combination, a central stationary extrusion-forming chamber from one end of which the extrusion is rectilinearly continuously discharged, and means operative to revolve about the longitudinal axis of the extrusion chamber and engageable with the extrusion at a location closely adjacent its point of discharge from the extrusion chamber to circumferentially mold the extrusion to shape at said location, said molding means including a plurality of arms circumferentially spaced about and pivotally mounted upon a support therefor rotatable about said extrusion chamber, said arms being respectively adapted for pivotal movement in planes extending parallel to and radially of the longitudinal axis of the extrusion, the outer end of each said arm having operatively associated therewith an extrusion shaping element. 4

2. An extrusion head as defined in claim 1 wherein is provided means engageable with the inner ends of said arms to adjustably radially shift the latter toward and away from one another to thereby correspondingly adjust the spacing between said ends of the extrusion shaping elements.

3. An extrusion head as defined in claim 2 wherein said arm adjusting means consists of a member which is axially shiftable on said rotatable support for said pivoted arms and engages the latter to vary the radial spread thereof.

4. An extrusion head as defined in claim 2 including means for locking said pivoted arms in their radially adjusted positions relative to said arm shifting means.

5. An extrusion head as defined in claim 1 wherein said extrusion shaping elements extend lengthwise of the extrusion chamber and terminate in inwardly turned portions closely overhanging the discharge end of the extrusion chamber.

6. An extrusion head as defined in claim 1 wherein said extrusion shaping elements are respectively rectilinearly shiftable toward and away from one another along a line perpendicular to and intersecting the axis of the extrusion.

7. An extrusion head as defined in claim 6 wherein means is provided for translating said radial movement of said pivoted arms into said rectilinear movement of said extrusion shaping elements.

8. An apparatus for molding an extrusion of plasticized material to a cylindrical shape of the same or progressively different diameter along the length thereof comprising, in combination, a central hollow member constituting an extrusion chamber from which the plasticized material is extruded in the form of a modable column of a predeterminedly established cross-sectional area, an annular assembly surrounding said central member, said assembly including a cylinder journalled for rotation about said extrusion chamber and a cam ring encircling said cylinder, said cam ring being axially shiftable and rotatable with said cylinder, and means operatively connected to said cylinder adjacent its extrusion-discharging end and rotatable therewith for shaping the extrusion as it exits from the extrusion chamber, said extrusion-shaping means including at least one element having a free end adapted to be shifted radially toward and away from the longitudinal axis of the extrusion to mold the same to a diameter determined by the radial distance of said end from said axis, said extrusion-shaping means being engageable by said axially shiftable cam ring to selectively vary said radial distance.

9. An apparatus as defined in claim 8 wherein said extrusion-shaping means includes a plurality of said free-ended elements spaced circumferentially about said longitudinal axis, said plurality of rotating elements being commonly engageable by said cam ring to simultaneously and uniformly vary the positions of said shaping ends relatively to the extrusion and thereby conjointly describe a shaping orifice of predetermined diameter.

10. An apparatus as defined in claim 8 wherein said extrusion-shaping means includes a pair of said free-ended elements disposed in diametrically opposed relation with respect to the extrusion whereby upon rotation thereof about said extrusion they conjointly describe a circle defining the shaped cross-sectional size of the extrusion passing therebetween.

11. An apparatus as defined in claim 8 including means for effecting high speed rotation of said assembly and its operatively connected extrusion shaping means.

12. An apparatus as defined in claim 8 for effecting axial shifting of said cam ring simultaneously as the same rotates about the axis of the extrusion.

* * * * *